Figure 1:
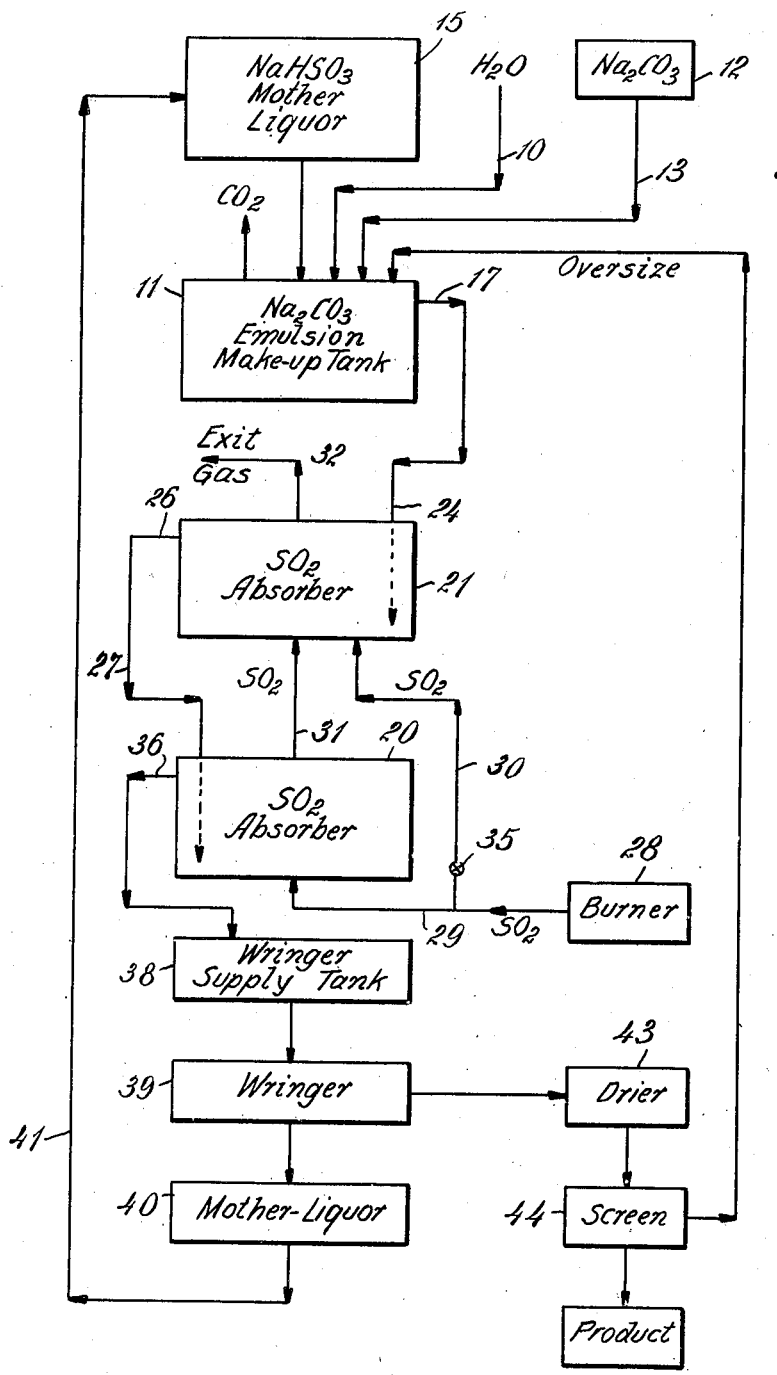

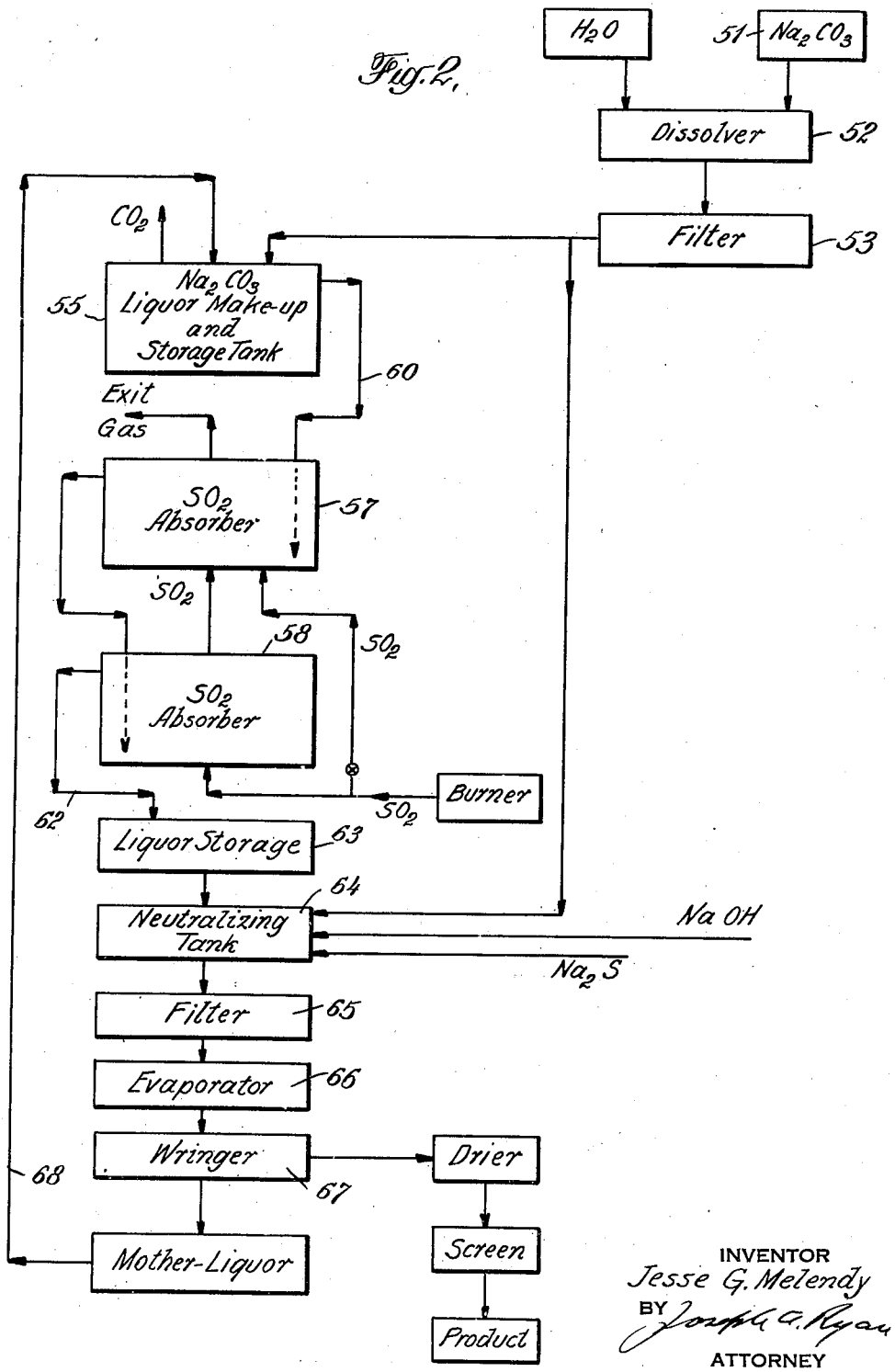

Patented June 17, 1941

2,245,697

UNITED STATES PATENT OFFICE 2,245,697

MANUFACTURE OF ALKALI METAL SULPHITES

Jesse G. Melendy, Tarrytown, N. Y., assignor to General Chemical Company, New York, N. Y., a corporation of New York Application April 24, 1939, Serial No. 269,631

8 Claims. (Cl. 23—130)

This invention relates to manufacture of alkali metal sulphites. More particularly the invention is directed to improvements in processes for making anhydrous sodium bisulphite or anhydrous sodium sulphite.

In production of sodium sulphites whether anhydrous bisulphite, or anhydrous or hydrous sulphite, the liquors circulated thru the process contain more or less sodium sulphite. Especially in production of low sulphate products, the comparative ease with which the contained sulphite oxidizes to sulphate constitutes basis of one of the principal operating difficulties encountered, namely, formation and accumulation in the circulating liquors of sodium sulphate with the result that the sought for sulphite products are contaminated with sodium sulphate to an objectionable degree. Prior methods have been such that substantial oxidation of sulphite to sulphate takes place during processing, and in order to obtain sulphite products reasonably low in sulphate general practice has been to intermittently bleed out of the system and dispose of relatively large quantities of mother liquor for reason none other than to get rid of sodium sulphate.

The principal object of this invention is to provide for manfacture of sodium sulphites especially anhydrous sodium bisulphite, and also sodium sulphite anhydrous or hydrous by methods by which oxidation of sodium sulphite to sodium sulphate is minimized.

The improvements may be discussed first in connection with manufacture of anhydrous sodium bisulphite. The customary prior method for making this product is carried out generally as follows. The mother liquor, obtained after removal of sodium bisulphite in crystal form, contains variable quantities of sodium bisulphite and some sodium sulphite, both in solution. To this mother liquor, sodium carbonate is added in quantity such that the resulting liquor or so-called emulsion contains sodium carbonate not only in solution but also in suspension. The emulsion is then gassed with $SO_2$ until no more $SO_2$ is absorbed. In the resulting so-called finished liquor, part of the sodium bisulphite produced is in solution and part in suspension as anhydrous sodium bisulphite. The suspended sodium bisulphite is separated from the liquor by centrifuging or otherwise and constitutes the ultimate product while the sodium bisulphite mother liquor, containing more or less sodium sulphite, is used again to form the sodium carbonate emulsion or suspension of the next batch.

In making up the initial sodium carbonate suspension, practice has been to add the sodium carbonate to the acid sodium sulphite liquor. During such addition, sodium bisulphite of the mother liquor becomes neutralized to normal sodium sulphite, and on continued addition of sodium carbonate some of the latter goes into solution while the remainder stays in suspension. It will be seen that in this emulsion forming operation, the liquor passes from a strongly acid condition first to the neutral sodium sulphite stage, second through a weakly alkaline stage, and third to a strongly alkaline condition approaching the alkalinity of a saturated sodium carbonate solution. The emulsion is then gassed with $SO_2$, and the liquor very gradually passes back from strongly alkaline, through weak alkalinity with gradual evolution of $CO_2$, through neutral sodium sulphite, and finally to the acid sodium bisulphite. Of necessity, the operation is slow because $CO_2$ evolution is slow particularly since the gas generated tends to cause serious foaming, and thus the reaction liquor is alkaline or neutral for a prolonged period. Such procedure is exemplified by Strickler U. S. Patent 1,023,179 of April 16, 1912. Methods of this type result in a constant building up of the sulphate content of the circulating liquors. While commercial requirement for producing sodium sulphite low in sulphate has been recognized, previous attempts to accomplish this end have been directed to removal of sodium sulphate from the system either by bleeding out mother liquors or by subjecting mother liquors to some form of treatment to remove sulphate. As distinguished from such sulphate removing procedures, this invention involves a method by which oxidation of sodium sulphite to sodium sulphate is substantially prevented.

In most plant operations, for economic reasons, the mother liquor is used to make up the soda ash liquor subsequently gassed with sulphur dioxide. I have found that practically all of the oxidation of sulphite to sulphate takes place during two principal steps of the process; namely, while making up the soda ash liquor (when sulphite containing mother liquor is used), and while gassing the liquor with sulphur dioxide. From development work constituting the basis of this invention, I believe that, in the processing of sulphite liquors, oxidation of dissolved sodium sulphite to sodium sulphate takes place almost entirely during two phases,—first, when the make-up liquors or the liquors being gassed are at about the neutral sodium sulphite point, and second, where such liquors are slightly alkaline, and that of these two phases, oxidation takes place most rapidly at the neutral sodium sulphite stage. From above discussion of prior art methods, it will be noted in previous operations that during make up of the soda ash emulsion, the liquor passes gradually from the acid thru the neutral sodium sulphite and slightly alkaline stages to the more strongly alkaline condition, and that while gassing of the emulsion with $SO_2$ the liquor passes very slowly back from strong through the weak alkaline and neutral sodium sulphite stages to strong acidity. Thus, in prior practice, the liquor passes four times through those phases in which my work indicates practically all oxidation of sulphite to sulphate takes place. Regardless of correctness of my belief as to reasons involved, I have devised an operating method by practice of which little or insignificant conversion of sulphite to sulphate takes place. I have found first that if (when using sulphite containing mother liquor) the soda ash liquor make-up operation is carried out so that the liquor is always definitely alkaline; and second that if the $SO_2$ gassing of the liquor is carried out so that the liquor being gassed is always definitely acid,—oxidation to sulphate of sulphite, involved in the utilization of the mother liquor and also inclined to form during gassing, is for all practical purposes avoided. Thus, my process is such that those phases during which, I believe, oxidation of sulphite to sulphate most readily takes place are so rapidly passed thru that there is no opportunity for sulphite oxidation.

Applied to production of anhydrous sodium bisulphite, procedure involved in my improved process may be outlined briefly as follows. In manufacture of anhydrous sodium bisulphite, as is understood in the art, the sodium constituting the anhydrous sodium bisulphite crystals obtained in suspension after completion of $SO_2$ gassing corresponds with sodium of the suspended sodium carbonate of the initial soda ash emulsion, that is, the liquor gassed with $SO_2$ is not a clear solution but is a sodium sulphite-sodium carbonate solution carrying sodium carbonate in suspension. When proceeding in accordance with the process of the invention, the soda ash emulsion is formed in such a way that all during the emulsion make-up operation, the liquor contains suspended sodium carbonate. Thus, the make-up liquor is always strongly alkaline. In an $SO_2$ gassing reaction zone, I prepare a sodium sulphite liquor which is acid at least to a hereinafter specified degree. The soda ash emulsion is then introduced into the reaction zone and $SO_2$ gassing is commenced. Introduction of emulsion and gassing are both controlled so that the liquor in the reaction zone is constantly maintained acid at least to such specified degree. Gassing is then continued until substantially all of the sulphite is converted to the bisulphite. Production of anhydrous sodium bisulphite according to the invention may be more fully described in connection with the accompanying drawings Fig. 1 of which shows diagrammatically apparatus which may be employed.

In starting up, water from line 10 is run into make-up tank 11, preferably a vat of substantial size equipped with an agitator designed to keep solids present thoroughly suspended. Water introduced throughout the process is preferably warmed to about 40°C. to facilitate solution of soda ash. Sodium carbonate from bin 12 is charged into the vat by conveyor 13 constructed to permit ready control of quantity and rate of feed. The amount of soda ash introduced at the start is such that the preliminary sodium carbonate solution formed in tank 11 contains a substantial amount of sodium carbonate kept in suspension by agitation. Reservoir 15 may contain a supply of sodium bisulphite mother liquor from a previous operation. A typical mother liquor may contain $NaHSO_3$ 19%, $Na_2SO_3$ 9.6%, $Na_2SO_4$ 0.2%, together with relatively small amounts of impurities such as iron oxide, alumina, and silica. As soon as a suspension of sodium carbonate in water is formed in vat 11, introduction of sodium bisulphite mother liquor from reservoir 15 may be commenced. Mother liquor in reservoir 15 is strongly acid and may have an acidity of about 24 cc., that is a 10 cc. sample of the liquor requires about 24 cc. of N/1 NaOH to bring the sample back to neutral to phenolphthalein. It will be understood that bisulphite reacts acid, sulphite reacts neutral, and sodium carbonate reacts alkaline to phenolphathalein. One of the important advantages arising from my discoveries is that the process as a whole may be operated in a continuous manner. Accordingly, soda ash, sodium bisulphite mother liquor and the required amounts of water may be introduced simultaneously and continuously into vat 11, feed of these materials being regulated so that the mass in tank 11 always contains sodium carbonate in suspension. Thus, the mass may contain 18% $Na_2CO_3$ and have specific gravity of about 1.5, alkalinity is high and for example may be 57 cc., that is, a 10 cc. sample of the liquor of the mass requires 57 cc. of N/1 $H_2SO_4$ to bring the sample back to neutral to phenolphthalein. Other important advantages resulting from making up the suspension as indicated are that lumping of soda ash is avoided and escape of $CO_2$ is uniform so that troublesome foaming in the make-up tank is prevented.

It will be understood that the amount of sodium subsequently recovered from the process as anhydrous sodium bisulphite crystals is equivalent to the amount of sodium carried in suspension in the emulsion in vat 11. Feed of raw materials to vat 11 should be controlled so that the mass in the vat contains not less than 12.5% sodium, and to obtain the more satisfactory yields of sodium bisulphite the mass should contain preferably not less than about 16% sodium. When proceeding as described, the acid sodium bisulphite mother liquor is introduced into a mass which is always strongly alkaline and the sodium bisulphite mother liquor passes quickly from strong acid through the neutral sodium sulphite and weak alkalinity stages to strong alkalinity. I believe that it is because of such rapid change thru neutral and weak alkalinity that oxidation of sodium sulphite to sulphate is prevented.

Another major important advantage is largely obtained by making up the soda ash emulsion as described. Commercial grades of soda ash contain small but appreciable quantities of water insoluble impurities such as $SiO_2$, $Al_2O_3$, $Fe_2O_3$, $CaCO_3$ and $MgCO_3$. While in manufacture of sodium sulphite, hydrous or anhydrous, such insoluble impurities may be partly removed by preliminarily dissolving the soda ash in water and filtering, in the production of sodium bisulphite the liquors employed are thick emulsions which may not be filtered. In the latter instance, it is therefore important, especially in the production of high-test anhydrous sodium bisulphite, to get water insoluble impurities into solution so that impurities will not go out of the system with and contaminate the ultimate sodium bisulphite crystal product. Practically all of the water insoluble impurities contained in commercial soda ash are soluble in strong alkaline solution. Accordingly, by maintaining strong alkalinity in vat 11, e. g. the inherent alkalinity of a sodium carbonate emulsion, such impurities are partly or fully dissolved. Solution of these impurities is not instantaneous, and I have found that best results, with regard to effecting solution of impurities, may be obtained where the emulsion make-up operation is carried out so that each portion of the emulsion is aged for an appreciable period of time. Vat 11 is provided with overflow 17. The size of the vat, rate of introduction of soda ash, sodium bisulphite mother liquor and water if needed together with the rate of withdrawal of emulsion thru overflow 17 are additionally regulated so that any unit of liquor has an opportunity to age in tank 11 for at least one and preferably up to about 3 hours before discharge. Thus, where the soda ash emulsion is made up as described, first, oxidation of the sodium sulphite content of the sodium bisulphite mother liquor is substantially prevented, and second, the water insoluble impurities normally present in commercial soda ash are dissolved and passed into solution.

Absorbers 20 and 21 are filled up to working level with emulsion from vat 11 introduced through line 24 terminating near the bottom of absorber 21. The absorbers are arranged advantageously one above the other, and each is equipped with an agitator. Liquor runs by gravity from absorber 21 through an overflow 26 and line 27 into the lower absorber. Burner 28 may be of any conventional type operating to burn for example brimstone to form a gas containing from say 6 to 12% $SO_2$ and 15 to 9% oxygen by volume. Gas containing for example about 7.5% and 13.5% oxygen by volume from burner 28 is introduced into the bottom of absorber 20 through lines 29. The absorbers are closed-top vessels, the construction being such that gas not absorbed in the liquor in lower absorber 20 flows upwardly thru line 31 and is introduced into the bottom of the liquor in upper absorber 21. For convenience in operating, from time to time controlled amounts of $SO_2$ gas may be introduced into the bottom of absorber 21 directly through line 30. Exit gases leave the top of upper absorber 21 through outlet 32.

After both absorbers are filled with emulsion from vat 11 and the agitators started, gassing with $SO_2$ through both lines 29 and 30 is commenced and continued until the liquor in at least the upper absorber, and also in the lower absorber, has an acidity of not less than 6 cc., that is, a 10 cc. sample of the liquor requires 6 cc. of N/1NaOH to bring the 10 cc. sample to neutral to phenolphthalein. As soon as the 6 cc. acidity is reached in the upper absorber feed of emulsion from vat 11 is again started and kept continuous thereafter.

During normal operation, practically all of the $SO_2$ employed in the process enters lower absorber thru line 29, and the $SO_2$ which passes unabsorbed through the liquor rises through line 30 and supplies $SO_2$ to absorber 21. However, there may be instances in which in order to maintain the minimum acidity in upper absorber 21, regulated amounts of $SO_2$ gas may be fed into absorber 21 directly through line 30 by regulation of valve 35. Regardless of how sulphur dioxide is introduced, rate of gassing of the liquor in absorber 21 and rate of introduction of the emulsion from vat 11 are controlled so as to constantly maintain the liquor in the upper absorber at an acidity such that the acidity of a representative sample taken any time during operation is not less than 6 cc. Such acidity is well on the acid side, and I have found that by so proceeding the emulsion from vat 11 is swung over rapidly from strong alkalinity to relatively strong acidity. In the prior art methods in which the soda ash emulsion is directly gassed, the liquor passes gradually from strongly alkaline through weak alkalinity and the neutral sodium sulphite stage to the acid condition. Absorption of $SO_2$ is very slow, and conversion from the alkaline to the acid side covers a long time interval. It appears to be for this reason that most of the oxidation of sulphite to sulphate occurring in previous practice takes place at this point. In the present method such oxidation is substantially completely prevented. Of the two operations described, namely, preparation of the soda ash emulsion and $SO_2$ gassing, the latter is the more important and may be used to marked advantage even where the emulsion is made up in any way.

One important operating advantage arising from my discoveries is that ordinary burner gas may be employed and a high test product obtained. Previously, in cases where a low sulphate product has been desired, relatively pure $SO_2$ gas has been used for the purpose of cutting down oxidation of sulphite to sulphate by free oxygen present in the burner gas. My investigations indicate that most oxidation encountered in the prior practice was caused by making up the emulsion in such a way that the liquor passed gradually from the acid to the strongly alkaline side, and more especially in the gassing operation where the liquor passed very slowly from the strongly alkaline back to acid. By conducting gassing, and preferably also emulsion make-up, as described I am enabled to employ ordinary burner gas as the source of $SO_2$.

The temperature of the liquor in the upper absorber should be kept at not less than the transition point of $Na_2SO_3$ to $Na_2SO_3.7H_2O$, i. e., about 92° F. If desired, the upper absorber may be equipped with heating coils to maintain the necessary temperature, although as a rule heat of reaction is sufficient. Preferably, acidity of the liquor in absorber 21 should not exceed about 14 cc. At higher acidity, absorption of $SO_2$ becomes inefficient and it is difficult to use all of the $SO_2$ in the gas, and for the same reason temperature should not exceed about 120° F. During course of usual operation, the liquor continuously maintained in the upper absorber is largely sodium sulphite and a relatively small amount of sodium bisulphite. Where acidity is not much in excess of 6 cc., the liquor may still contain appreciable amounts of $CO_2$. Gases leaving absorber 21 through outlet 32 comprise diluent gases introduced with $SO_2$, water vapor, and variable amounts of $CO_2$. Ordinarily over half of the $SO_2$ utilized is reacted in the upper absorber.

Liquor continuously runs out of the upper absorber 21 through overflow 26 and is conducted by pipe 27 to the bottom of absorber 20. In the latter, the liquor is gassed with sulphur dioxide until substantially all of the normal suphite is converted to bisulphite. Preferably, in the lower absorber temperatures not less than about 120° F. are maintained principally for the purpose of producing easily filterable anhydrous sodium bisulphite crystals. While temperatures of this order may be obtained as a rule by heat of reaction, it is more likely that extraneous heat, supplied by a suitable heating coil, may be needed in the lower absorber than in the upper absorber. However, temperatures should not exceed about 140° F., since higher temperatures materially reduce $SO_2$ absorption.

Rates of feed of raw materials to make-up tank 11, feed of emulsion to absorber 21, transfer of liquor to absorber 20, $SO_2$ gassing in both absorbers, and overflow from absorber 20 are all regulated so that the liquor leaving absorber 20 by overflow 36 is what may be designated a finished liquor, i. e. it will absorb no more $SO_2$. The anhydrous sodium sulphite, often referred to as sodium metabisulphite or sodium pyrosulphite $Na_2S_2O_5$, thus produced is carried in suspension. The crystal size is such that the product may be readily separated from the mother liquor by centrifuging or filtration. Crystal form and size are such that mother liquor does not strongly adhere with the result that impurities, such as iron and lead salts, silica, alumina, etc., in the mother liquor, do not materially contaminate the product on drying.

Liquor from absorber 20 is run into wringer supply tank 38 and thence to wringer 39, the mother liquor being returned through collecting tank 40 and line 41 to reservoir 15.

Crystals from wringer 39 are dried in a suitable drier 43 and then cooled to atmospheric temperature, drying and cooling both being effected while the crystals are preferably kept out of contact with oxygen. The crystals may be sized by screen, 44, and the oversize material, if any, returned to make-up tank 11.

The above principles may be applied with no material variation to manufacture of anhydrous sodium sulphite as described in connection with Fig. 2 of the drawings showing diagrammatically apparatus units generally similar to those shown in Fig. 1.

One of the principal procedural differences involved in production of anhydrous sodium sulphite is that the liquors are filterable solutions as distinguished from the unfilterable emulsions processed in making the bisulphite. This distinction may be made use of at the start for the purpose of removing water insoluble impurities ordinarily present in commercial soda ash. Sodium carbonate from bin 51 is dissolved in water in dissolver 52. Proportions of sodium carbonate and water used are such that the solution after filtration has an alkalinity (for reason which will presently appear) of above 6 cc., that is a 10 cc. sample of the solution requires 6 cc. of $N/1$ $H_2SO_4$ to bring the solution back to neutral to phenolphthalein. The amount of soda ash used is preferably such as to form a substantially saturated solution at the prevailing temperatures. The solution may be filtered in filter 53 to separate some water insoluble impurities such as $SiO_2$, $Al_2O_3$, $Fe_2O_3$, $CaCO_3$ and $MgCO_3$. Make-up tank 55 is then filled with sodium carbonate solution up to convenient working level. A typical sodium sulphite mother liquor, e. g. as in pipe line 68, may contain for instance $Na_2SO_3$ 21%, $Na_2SO_4$ 0.2%, and small amounts of other impurities. To avoid, as far as feasible, oxidation of $Na_2SO_3$ in the mother liquor, the latter is preferably fed directly into make-up and storage tank 55 and immediately converted to alkaline condition. Hence, mother liquor and further amounts of sodium carbonate solution in filter 53 are introduced into tank 55 continuously and simultaneously, the respective quantities of each being controlled to constantly maintain in tank 55 an alkalinity of not less than 6 cc. In accordance with the invention it has been found that such minimum alkalinity prevents oxidation to sulphate of the sodium sulphite contained in the mother liquor. By proceeding in this way, conversion of sulphite to sulphate is minimized just as in the procedure followed in making up the sodium carbonate emulsion in tank 11 of Fig. 1. However, in tank 11 alkalinity may be appreciably higher (on account of inherent maximum alkalinity of the soda ash emulsion) than the alkalinity of the mass in tank 55. Maximum alkalinity of tank 11 is not necessary to prevent oxidation of sulphite to sulphate, the chief advantage of such high alkalinity being to facilitate solution of the water insoluble impurities which, on account of the previous filtering operation, are not present to great extent in the liquor in make-up tank 55 of Fig. 2. Thus in the production of sodium sulphite, with respect to the soda ash solution make-up operation, the precaution to be taken is that introduction of sodium sulphite mother liquor and soda ash solution be conducted in such a way that the liquor in make-up tank 55 always has an alkalinity of not less than 6 cc. Since water insoluble impurities normally present in commercial soda ash have been removed by filter 53, ageing of the liquor in make-up tank 55 is not important in the production of sodium sulphite.

Upper absorber 57 and lower absorber 58 are filled to working levels with liquor from tank 55 by means of pipe 60. Liquor in each absorber is then gassed with $SO_2$ until acidity of not less than 6 cc. is obtained. Feed of liquor from tank 55 to upper absorber 57 is again commenced and introduction of such liquor and gassing of the mass in upper absorber 57 are thereafter controlled so that the acidity in the upper absorber is constantly not less than 6 cc. Operation of absorber 57 with respect to introduction of sodium carbonate liquor, temperature, acidity, $SO_2$ gassing, and composition of the liquor formed are substantially the same as the operation of absorber 21 of Fig. 1. The resulting liquor comprising sodium sulphite, a lesser amount of sodium bisulphite and appreciable quantities of unexpelled $CO_2$ overflows continuously into lower absorber 58 in which $SO_2$ gassing is continued. Rates of introduction of raw materials into make-up tank 55, transfer of sodium carbonate liquor to absorber 57, overflow of liquor from absorber 57 into absorber 58, and $SO_2$ gassing in absorber 58 are all controlled so that the liquor overflowing from the lower absorber through line 62 into liquor storage tank 63 has been gassed to the point where all of the $CO_2$ is expelled.

The mass collecting in tank 63 is a solution comprising sodium bisulphite and a lesser amount of sodium sulphite. This strongly acid solution partially is neutralized to sodium sulphite, e. g. to about 8 cc. acidity, in tank 64 by means of soda ash solution from filter 53. Neutralization to sodium sulphite is completed by addition of preferably 32° Bé. caustic soda, and the neutralized liquor may then be treated with sodium sulphide as shown in Butler U. S. Patent 1,937,944 of December 5, 1933. Completion of neutralization by caustic soda effects precipitation of iron salts, and sodium sulphide treatment causes precipitation as sulphides of other impurities such as lead. The neutralized liquor is then filtered in filter 65, and the filtrate transferred to an evaporator 66. Temperature conditions in absorber 58 are maintained high enough by heat of reaction and possibly supplemental heating by suitable heating coils so that liquor delivered to evaporator 66 is at temperatures above the transition point of $Na_2SO_3$ to $Na_2SO_3.7H_2O$.

The liquor is evaporated at temperatures above the transition point of $Na_2SO_3$ to $Na_2SO_3.7H_2O$ in conventional manner to precipitate anhydrous sodium sulphite. The thick sludge obtained is run into wringer 67, the resulting mother liquor running into line 68. Sodium sulphite crystals from the wringer are dried and screened in the usual way. If desired filtration of sodium carbonate solution in filter 53 may be omitted and filtration in filter 65 may be relied upon to remove water insoluble impurities contained in the initial soda ash.

The same procedure followed in making anhydrous sodium sulphite may be used to make $Na_2SO_3.7H_2O$ except that instead of evaporating, the liquor from filter 65 may be run into a crystallizer, cooled below the transition point of $Na_2SO_3$ to $Na_2SO_3.7H_2O$, the hydrous crystals recovered and dried in known manner.

The mother liquor of any of the above modifications may be treated from time to time in any suitable way to remove cumulative impurities such as iron, silica, and aluminum.

In place of soda ash caustic soda may be used as source of sodium of the final products. In some situations, as may be the case in large plant operations, the mother liquor resulting from any of the modifications described may be used in some other process, in which case in practice of the present process no mother liquor is used in making up the liquors to be gassed. In this instance no particular precautions need be taken in making up such liquors since no sodium sulphite is present and no steps need to be taken to prevent oxidation of sulphite to sulphate in the make-up operation.

One of the outstanding advantages resulting from the invention is that the operation may be effected on a continuous basis. Results of this are that $SO_2$ gassing may be readily controlled so that the acidity in the upper absorber may be easily regulated and the exit gas of the upper absorber contains practically no $SO_2$. The process of the invention makes possible another advantage in that more than three times as much product may be made as when using substantially the same apparatus but operated in accordance with the prior usual procedure.

Gassing has been described as a two-stage operation. Gassing might be carried out in a single stage although absorption of $SO_2$ would usually be so low and consequent loss of $SO_2$ so great, that single stage gassing would be economically unattractive.

In the appended claims, the term "sulphite" unless otherwise indicated is intended to include either sulphite or bisulphite.

I claim:

1. The process for making anhydrous sodium bisulphite which comprises forming an aqueous sodium carbonate suspension, forming a sodium sulphite liquor having acidity of not less than that at which a representative 10 c. c. sample of the liquor requires 6 c. c. of N/1 NaOH to bring such 10 c. c. sample to neutral to phenolphthalein, introducing said suspension into said liquor while agitating the resultant mass and gassing the same with sulphur dioxide, controlling rates of introduction of said suspension and sulphur dioxide gassing so as to constantly maintain substantially the whole of said mass at acidity not less than that at which a 10 c. c. representative sample of the mass requires 6 c. c. of N/1 NaOH to bring such 10 c. c. sample to neutral to phenolphthalein, gassing the mass with sulphur dioxide to form a suspension of anhydrous sodium bisulphite, and separating the latter from the liquor.

2. The process for making anhydrous sodium bisulphite which comprises forming an aqueous sodium carbonate suspension by incorporating sodium sulphite containing mother liquor with sodium carbonate under conditions that during said incorporating the resulting liquor always contains sodium carbonate in suspension, forming a sodium sulphite liquor having acidity of not less than that at which a representative 10 c. c. sample of such liquor requires 6 c. c. of N/1 NaOH to bring such 10 c. c. sample to neutral phenolphthalein, introducing said suspension into said liquor while agitating the resulting mass and gassing the same with sulphur dioxide, controlling rates of introduction of said suspension and said sulphur dioxide gassing so as to constantly maintain substantially the whole of said mass at an acidity not less than that at which a 10 c. c. representative sample of the mass requires 6 c. c. of N/1 NaOH to bring such 10 c. c. sample to neutral to phenolphthalein, gassing the mass with sulphur dioxide to form a suspension of anhydrous sodium bisulphite, and separating the latter from the liquor.

3. The process for making anhydrous sodium bisulphite which comprises forming an aqueous sodium carbonate suspension, forming in a reaction zone a sodium sulphite liquor having acidity of not less than that at which a 10 c. c. representative sample of the liquor requires 6 c. c. of N/1 NaOH to bring such 10 c. c. sample to neutral to phenolphthalein, continuously feeding said suspension into said reaction zone while continuously agitating the resultant mass and continuously gassing the same with sulphur dioxide, controlling rates of feed of said suspension and said gassing so as to constantly maintain substantially the whole of the liquor in said zone at acidity not less than that at which a 10 c. c. representative sample of such liquor requires 6 c. c. of N/1 NaOH to bring such 10 c. c. sample to neutral to phenolphthalein, continuously withdrawing liquor from said zone and introducing such liquor into a second reaction zone, continuously gassing the liquor in said zone with sulphur dioxide to form a suspension of anhydrous sodium bisulphite, and separating the latter from the liquor.

4. The process for making anhydrous sodium bisulphite which comprises forming from the group consisting of sodium carbonate and sodium hydroxide and aqueous liquor containing not less than about 12.5% sodium, forming a sodium sulphite liquor having acidity of not less than that at which a representative 10 c. c. sample of the liquor requires 6 c. c. of N/1 NaOH to bring such 10 c. c. sample to neutral to phenolphthalein, introducing said aqueous liquor into said sulphite liquor while agitating the resulting mass and gassing the same with sulphur dioxide, controlling rates of introduction of said aqueous liquor and sulphur dioxide gassing so as to constantly maintain substantially the whole of said mass at acidity not less than that at which a 10 c. c. representative sample of the mass requires 6 c. c. of N/1 NaOH to bring such 10 c. c. sample to neutral to phenolphthalein, gassing the mass with sulphur dioxide to form a suspension of anhydrous sodium bisulphite, and separating the latter from the liquor.

5. The process for making anhydrous sodium bisulphite which comprises incorporating sodium sulphite containing mother liquor with material of the group consisting of sodium carbonate and sodium hydroxide under conditions that during said incorporating the resulting aqueous liquor at all stages of formation contains not less than about 12.5% sodium, forming a sodium sulphite liquor having an acidity of not less than that at which a representative 10 c. c. sample of the liquor requires 6 c. c. of N/1 NaOH to bring such 10 c. c. sample to neutral to phenolphthalein, introducing said aqueous liquor into said sulphite liquor while agitating the resultant mass and gassing the same with sulphur dioxide, controlling rates of introduction of said aqueous liquor and sulphur dioxide gassing so as to constantly maintain substantially the whole of said mass at an acidity not less than that at which a 10 c. c. representative sample of the mass requires 6 c. c. of N/1 NaOH to bring such 10 c. c. sample to neutral to phenolphthalein, gassing the mass with sulphur dioxide to form a suspension of anhydrous sodium bisulphite, and separating the latter from the liquor.

6. In the process for making sodium sulphite the steps comprising forming in a reaction zone a sodium sulphite liquor having an acidity of not less than that at which a representative 10 c. c. sample of the liquor requires 6 c. c. of N/1 NaOH to bring such 10 c. c. sample to neutral to phenolphthalein, introducing material of the group consisting of sodium carbonate and sodium hydroxide into said liquor while agitating the resultant mass and gassing the same with sulphur dioxide, and controlling rates of introduction of said material and sulphur dioxide gassing so as to constantly maintain substantially the whole of the mass in said zone at an acidity of not less than that at which a representative 10 c. c. sample of the mass requires 6 c. c. of N/1 NaOH to bring such 10 c. c. sample to neutral to phenolphthalein.

7. The process for making sodium sulphite which comprises incorporating sodium sulphite containing mother liquor with material of the group consisting of sodium carbonate and sodium hydroxide under conditions that during said incorporating substantially the whole of the resulting aqueous liquor has an alkalinity of not less than that at which a representative 10 c. c. sample of the liquor requires 6 c. c. of N/1 $H_2SO_4$ to bring such sample to neutral to phenolphthalein, forming a sodium sulphite liquor having an acidity of not less than that at which a representative 10 c. c. sample of the liquor requires 6 c. c. of N/1 NaOH to bring such 10 c. c. sample to neutral to phenolphthalein, introducing said aqueous liquor into said sulphite liquor while agitating the resulting mass and gassing the same with sulphur dioxide, controlling rates of introduction of said aqueous liquor and sulphur dioxide gassing so as to constantly maintain substantially the whole of said mass at acidity not less than that at which a representative 10 c. c. sample of the mass requires 6 c. c. of N/1 NaOH to bring such 10 c. c. sample to neutral to phenolphthalein, and gassing the mass with sulphur dioxide at least until the predominating proportion of the sodium present in the liquor is converted to sodium bisulphite.

8. The process for making anhydrous sodium bisulphite which comprises forming an aqueous sodium carbonate suspension by incorporating sodium sulphite containing mother liquor with sodium carbonate under conditions that during said incorporating the resulting liquor always contains sodium carbonate in suspension, forming in a reaction zone a sodium sulphite liquor having an acidity of not less than that at which a representative 10 c. c. sample of the liquor requires 6 c. c. of N/1 NaOH to bring such 10 c. c. sample to neutral to phenolphthalein, continuously feeding said suspension into said reaction zone while continuously agitating the resultant mass and continuously gassing the same with sulphur burner sulphur dioxide gas, controlling rates of feed of said suspension and said gassing so as to constantly maintain substantially the whole of the mass in said zone at an acidity not less than that at which a representative 10 c. c. sample of the mass requires 6 c. c. of N/1 NaOH to bring such 10 c. c. sample to neutral to phenolphthalein and an acidity not more than that at which a representative 10 c. c. sample of the mass requires 14 c. c. of N/1 NaOH to bring such 10 c. c. sample to neutral to phenolphthalein, continuously withdrawing liquor mass from said zone and introducing such liquor mass into a second reaction zone, gassing the liquor mass in said second zone with sulphur burner sulphur dioxide gas, withdrawing liquor mass from said second zone, regulating rate of feed of said suspension to the first zone, rates of withdrawal of the liquor mass from each of said zones, and rates of gassing in each of said zones to form a second zone effluent comprising bisulphite liquor containing anhydrous sodium bisulphite in suspension, and separating the latter from the liquor.

JESSE G. MELENDY.